Figure 1:
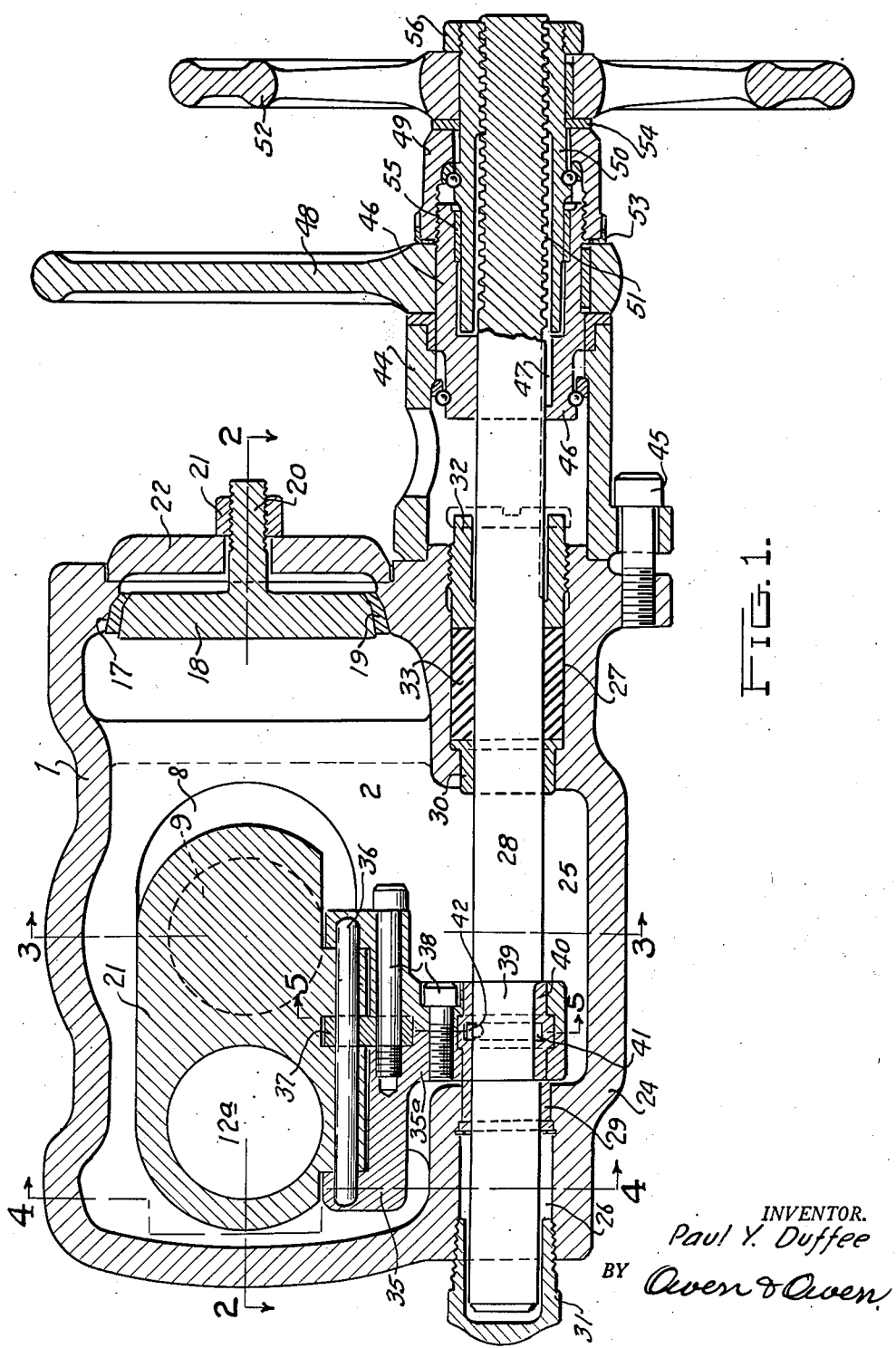

March 18, 1952 P. Y. DUFFEE 2,589,784
GATE VALVE
Filed June 30, 1947 6 Sheets-Sheet 1

INVENTOR.
Paul Y. Duffee
BY Owen & Owen
ATTORNEYS

March 18, 1952

P. Y. DUFFEE 2,589,784

GATE VALVE

Filed June 30, 1947

6 Sheets-Sheet 3

INVENTOR.
Paul Y. Duffee
BY
Owen & Owen,
ATTORNEYS

March 18, 1952 P. Y. DUFFEE 2,589,784
GATE VALVE
Filed June 30, 1947 6 Sheets-Sheet 4
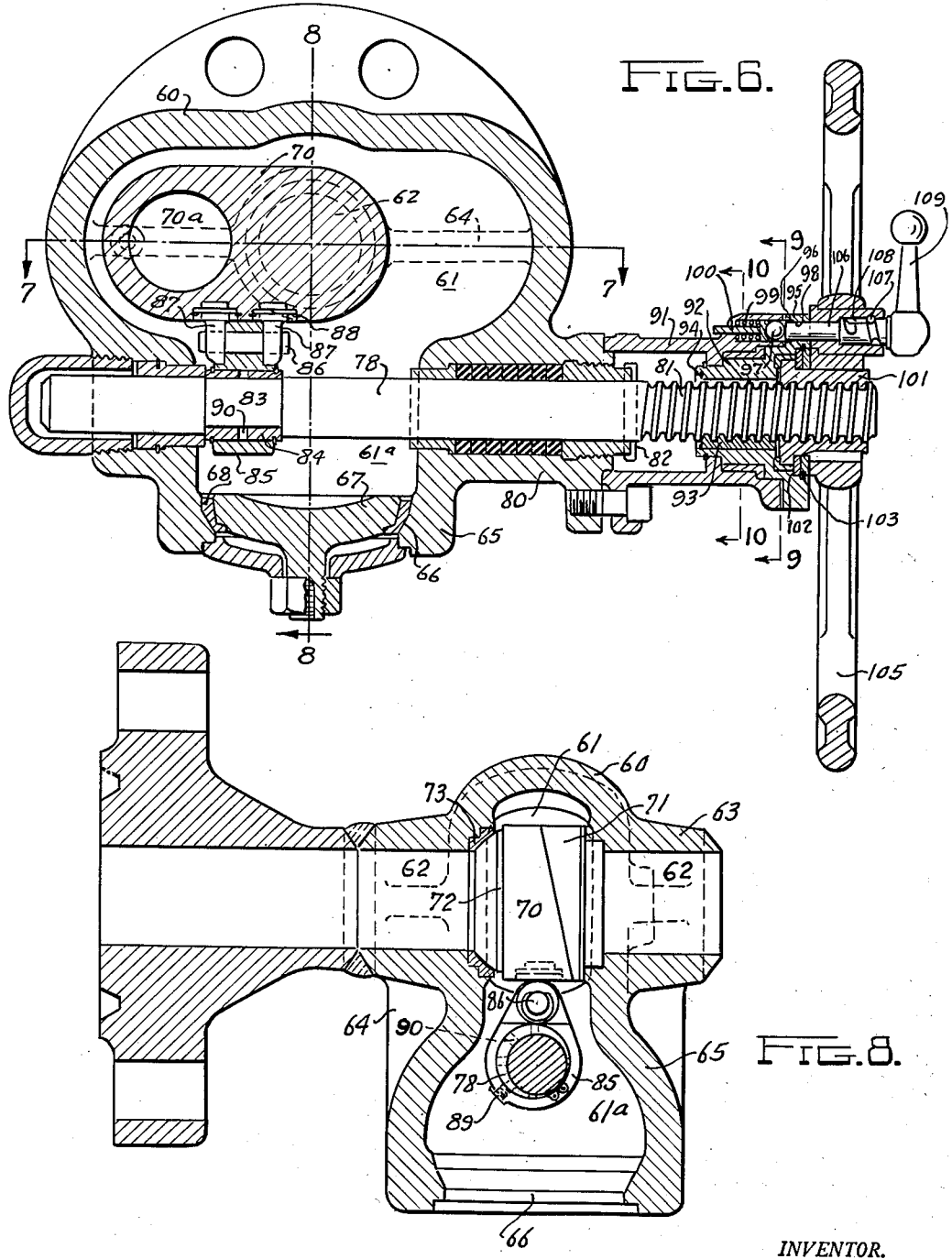
INVENTOR.
Paul Y. Duffee
BY Owen & Owen
ATTORNEYS March 18, 1952 P. Y. DUFFEE 2,589,784
GATE VALVE
Filed June 30, 1947 6 Sheets-Sheet 5
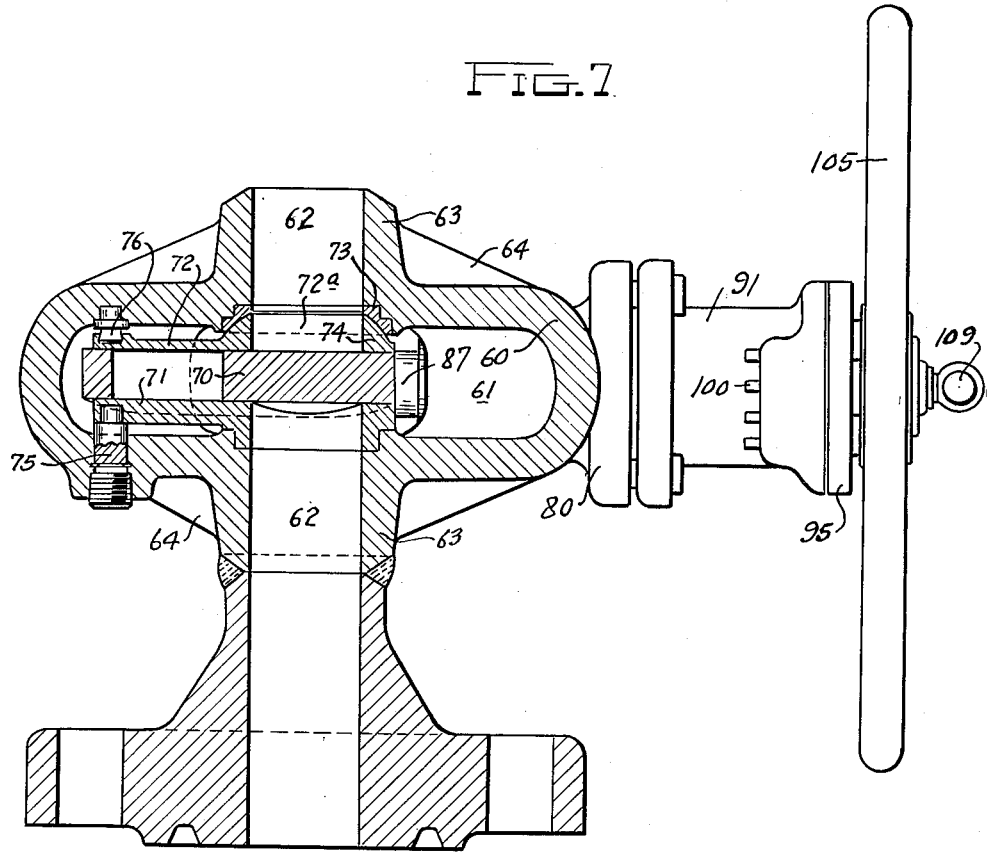
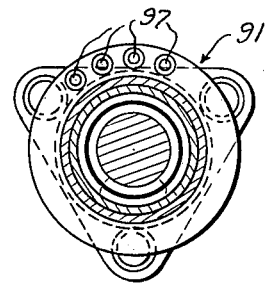
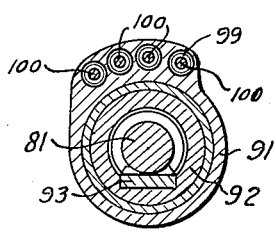
INVENTOR.
Paul Y. Duffee
BY Owen & Owen
ATTORNEYS March 18, 1952     P. Y. DUFFEE     2,589,784
GATE VALVE Filed June 30, 1947     6 Sheets-Sheet 6

INVENTOR.
Paul Y. Duffee
BY Owen & Owen
ATTORNEYS

Patented Mar. 18, 1952

2,589,784

UNITED STATES PATENT OFFICE 2,589,784

GATE VALVE

Paul Y. Duffee, Houston, Tex.

Application June 30, 1947, Serial No. 758,096

10 Claims. (Cl. 251—61)

This invention relates to gate valves designed particularly for use in conduits for carrying oil or other fluids of a liquid or gaseous nature under high pressures and has particular reference to valves of this character which are of the full conduit lubricated wedge type.

The primary object of the invention is the provision of a novel construction of valve of this character which permits an easy and rapid manipulation of the movable valve member to provide a full opening of the conduit and also a partial opening thereof to any desired extent, and which also permits a tight sealed closing of the valve.

Another object of the invention is the provision of simple and efficient means for effecting a close fitting of the coacting valve members to insure against leakage when in fully closed or open relation, and which means is also operable to effect an easy opening or breaking of the closing seal. Furthermore, such means is operable to seal the valve at any position of opening movement, which is important.

Another object of the invention is the provision in a valve of this character of separate independently operable means for imparting opening and closing movements to the valve and for locking or sealing it in any adjusted position, thus enhancing the practicability and commercial value of the valve.

Another object of the invention is the provision of a valve of the character described that is of such construction and arrangement of parts as to allow for a single pressure body for the operating parts and also a single fixture set-up of such body for machining purposes to insure a true relationship between the valve seats and the control shaft receiving parts.

Another object of the invention is the provision of a valve body casing adapted for mounting the valve members and control means therein and which is also adapted to be opened for inspection as to the operation of the internal parts and as to valve seat tightness in either open or closed position.

Another object of the invention is the provision of a universal adjustment for at least one of the valve seating members to permit perfect seating of the valve and seat members to compensate for any errors in machining.

Other objects and advantages of the invention will be apparent from the following detailed description, and from the accompanying drawings, illustrating one embodiment of the invention, in which—

Figure 2:
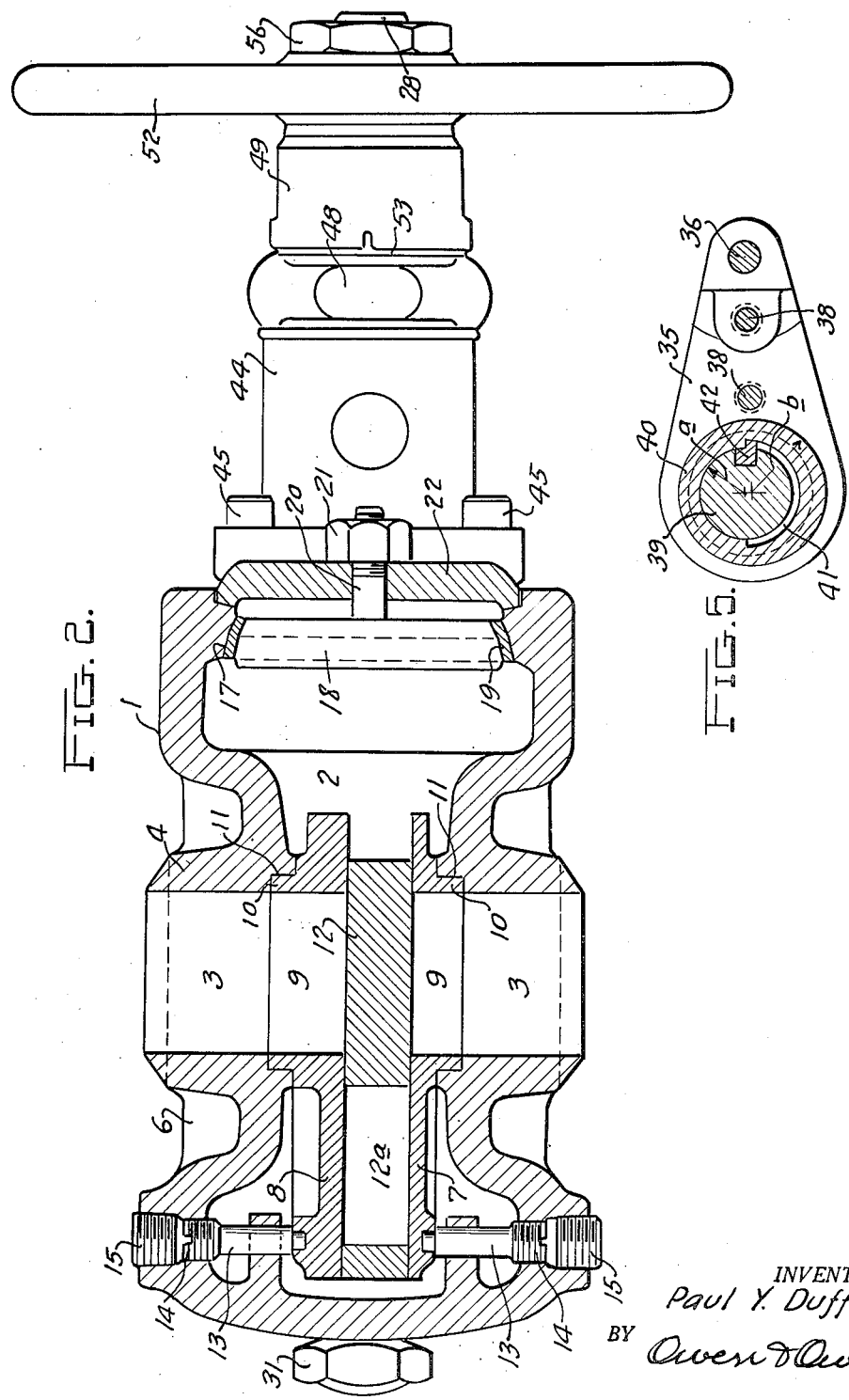
Figure 3:
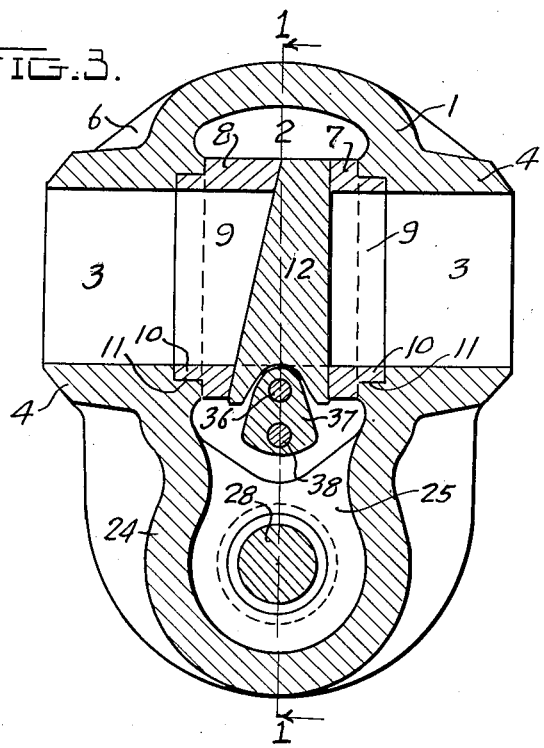
Figure 4:
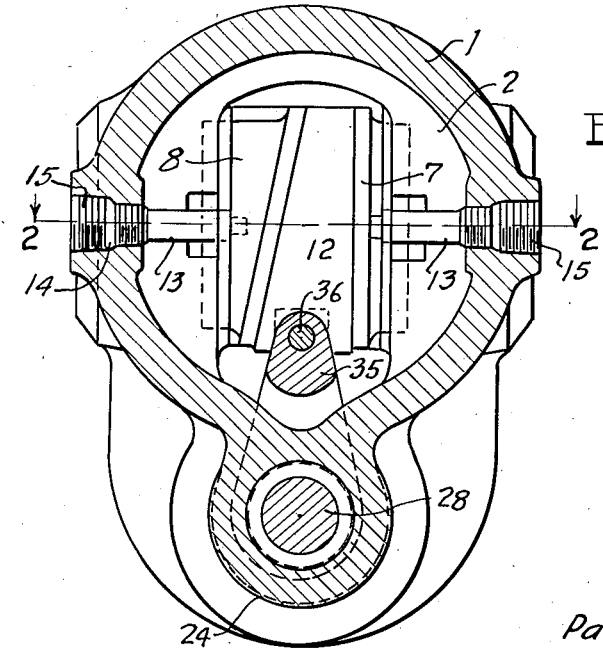
Figure 11:
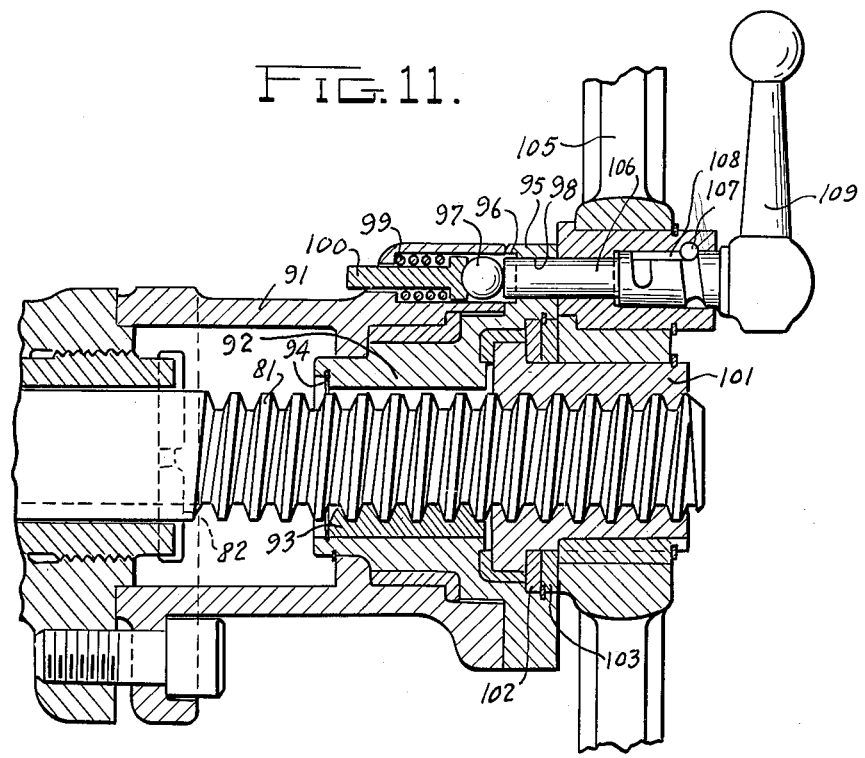
Figure 12:
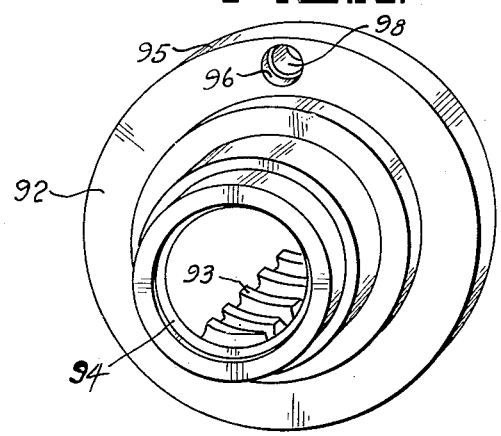

Fig. 1 is a central vertical longitudinal section of the valve taken on the line 1—1 in Fig. 3, with the movable valve member in closed position; Fig. 2 is a horizontal section on the line 2—2 in Fig. 1, with parts in full; Figs. 3 and 4 are cross-sections on the lines 3—3 and 4—4, respectively, in Fig. 1; Fig. 5 is a fragmentary sectional detail of the valve operating means taken on the line 5—5 in Fig. 1; Fig. 6 is a central longitudinal section of a different and preferred form of the valve, with the movable valve member seated in line closing position, with parts in full; Fig. 7 is a section thereof on the line 7—7 in Fig. 6; Fig. 8 is a section on the line 8—8 in Fig. 6, with parts in full and with the closure member for the inspection opening removed; Fig. 9 is an outer end view of the shaft extension bearing sleeve; Fig. 10 is a cross-section on the line 10—10 in Fig. 6; Fig. 11 is an enlarged section similar to Fig. 6 of the control portion of the device, and Fig. 12 is a perspective view of the lock collar.

Referring to the drawings, 1 designates a valve casing forming a chamber 2 therein which is elongated transversely of a conduit or fluid carrying line to which attached and is provided substantially centrally of its ends with directly opposed side openings 3 either of which may serve as the inlet or as the outlet opening of the valve, depending on the position of the valve in the fluid line. The portion of the casing forming each of these openings is outwardly extended to form a nipple 4 to which a pipe or a pipe attaching flange may be secured by welding or in any other suitable manner. These nipples are reinforced by external ribs 6.

A pair of opposed valve seat members 7 and 8 are disposed within the chamber 2 in spaced relation axially of the openings 3 with one fitted against the inner marginal edge of one opening and the other fitted against the inner marginal edge of the other opening. The order is not important. Each of such seat members has an opening 9 registering with and corresponding in size to the casing opening 3 with which associated and is provided, in the present instance, with an annular marginal edge flange 10 fitting into a marginal recess 11 in the inner end edge of the respective casing opening. Each seat member extends at one end, in the present instance, a short distance into the right end portion of the chamber 2 beyond the respective opening 3 and at its other end to nearly the end of the chamber at the other side of the opening, so as to form a guide for linear reciprocatory movements of a valve 12, as hereinafter described. A spot-pin 13 is threaded into each side of the casing 1 and engages the respective seat members 7, 8, at its extended end portion to cooperate with the flange 10 and recess 11 to properly position and to prevent turning of the member in the casing. The recess in each seat member with which the pin 13 engages may also serve as an index set-up point during the machining of said members. The casing holes 14, in the bottoms of which the spot-pins 13 are threaded, are closed at their outer ends by sealing plugs 15.

The valve coacting sides of the seat members 7 and 8 are plain, and in the case of the member 7, in the present instance, is normal to the axes of the openings 3 and 9, while in the case of the other member is inclined to such axes crosswise of the direction of longitudinal movement of the valve 12 therebetween, as best shown in Figs. 4 and 5.

The slide valve 12, which seats in the space between the two members 7 and 8, corresponds in shape to such space, having one side in a plane normal to the axis of the member openings 9 and its other side inclined thereto in parallel relation to the inclined surface of the coacting seat member. It is thus apparent that a movement of the valve transverse to the seat members, and from the large to the narrow end of the tapered space therebetween, causes a tight or wedge fit of the valve against the respective side faces of the seat members so as to prevent leakage of the line fluid past the seating surfaces. On the other hand, a movement of the valve in the opposite direction will effect a release of its sealing engagement with the seat members so that the valve may then be freely shifted lengthwise of such members to open or close the line passage through the valve means. For the purpose of such opening and closing action of the fluid line, the valve 12 is made solid at its right end portion (Figs. 1 and 2) to completely close the fluid line when in register therewith, while in its left end portion it is provided with an opening 12ᵃ that is movable into full open register with the seat openings 9 when the valve is moved to the limit of its movement to the right. The movement of the valve may be stopped at any intermediate position to effect a desired partial opening of the connected fluid line.

One end of the casing 1, the right in the present instance, is provided with an opening 17 to permit access to the interior of the casing and this is closed by a plug member 18 which has an internal seat through an intermediate gasket 19 against the wall of said opening. The plug member has a threaded stem 20 projecting outwardly from its center and receiving a nut 21 which is tightened against an outer cap member 22 to draw the plug member to its seat. The member 22 seats against the outer marginal edge of the opening.

The casing 1, outwardly from the broad edge of the valve 12, is provided with an enlargement or side extension 24 which, intermediate its ends, forms a side extension 25 of the valve chamber 2. The extension 24 is provided, at opposite ends of the chamber extension 25, with axially aligned openings 26 and 27 in which a shaft 28, spanning the chamber portion 25, is mounted. This shaft is both axially and rotatably movable, and at opposite ends of the recess 25 is mounted in travel limit bushings 29 and 30. The outer end of the opening 26 is closed by a cap 31 while the outer end of the opening 27 has a packing ring 32 mounted therein in engagement with a gland packing 33, the opposite end thrust of which is against the limit bushing 30. The shaft 28, which constitutes the operating valve stem of the unit, projects a distance outwardly from the opening 27 and is engaged by operating means as hereinafter described.

A bracket yoke 35 of substantially Y-form straddles a portion of the valve 12 lengthwise thereof at its broad edge and is attached thereto by a pin 36 which also passes through a link 37 that is connected to the yoke 35 substantially in longitudinal line with the central portion of the yoke leg 35ᵃ. The yoke, in the present instance, is made of two sections separated substantially centrally of the leg thereof and secured together by screws 38, one of which extends through and anchors the link 37 to the yoke.

The leg portion 35ᵃ of the yoke has an opening therein through which the shaft 28 extends, with an eccentric portion 39 of the shaft disposed therein. An eccentric bushing 40 is mounted around the eccentric part 39 of the shaft within said yoke opening and one half of such bushing has an interior circumferentially extending channel 41, in the present instance 180° in length, which receives a stop lug 42 that is anchored in and projects radially from the shaft 28, as best shown in Fig. 5. This interengagement of the stop lug and recess, which provides a lost motion connection between the shaft and bushing, permits the shaft to turn 180° relative to the bushing and to effect a turning of the bushing therewith should the shaft movement be greater than this at either end of the channel.

It will be noted that the eccentric shaft part 39 and the bushing 40 have separate centers with the radius of one designated $a$ and of the other $b$ in Fig. 5. It is apparent that a relative turning of the shaft 28 and bushing 40 will effect seating and unseating transverse movements of the valve 12, normal tight seating being effected when the parts are in the relative positions shown in Fig. 5, with the throw of the shaft eccentric 39 substantially at its maximum toward the valve 12 and with the stop 42 in the direct line of thrust of the yoke pin 36 on the valve and at the inner end of the bushing channel 41, such line conforming to the section in Fig. 1. In such position of the parts, the axis of the bushing radius $b$ is offset from the axis of radius $a$ transverse to said thrust line toward said channel 41. A continued turning of the shaft 28 with the stop 42 in engagement with the inner end wall of the channel 41 will cause a turning of the bushing 40 with the shaft and, due to the then relative positions of the shaft and bushing axes, will impart a consequent greater seating force to the wedge valve 12, as will be apparent by reference to Fig. 5. To unseal the wedge valve 12, the shaft 28 is turned in clockwise direction (Fig. 5), thus throwing the shaft eccentric outward to move the valve transversely from its seat and at the same time moving the stop 42 outwardly in the recess 41 and causing it to engage the outer end wall of the channel 41 to return the bushing 40 to its normal position in the yoke arm 35ᵃ. For convenience of assembly and machining, the bushing 40 is made in two sections with the plane of separation longitudinal to and intersecting the bushing axis and with the channel 41 entirely in one section.

The end of the casing extension 24 from which the shaft 28 projects is extended by a bearing sleeve 44 that has its inner end flanged and secured to the casing extension end by screws 45.

A sleeve 46 is keyed to the shaft 28 at 47 within the outer end portion of the sleeve 44 in which it has a bearing and at its outer end projects from the sleeve 44 and has an operating lever 48 fixed thereto. A bearing collar 49 is threaded to and projects outwardly from the outer end of the bushing 46, and in this collar and in the outer end of the sleeve 46 is journaled an internally threaded sleeve 50 for free rotary movements. This sleeve has its outer end portion, which projects beyond the collar 49, threaded on the outer threaded end portion 51 of the shaft 28, the shaft thread being longer than that of the sleeve 50. The length of the shaft thread 51 is such with respect to the threaded portion of the sleeve 50 as to adapt a turning of the sleeve to impart a full stroke movement to the valve yoke 35 between the stops 29 and 30. A hand wheel 52 is fixedly mounted on the sleeve 50 to turn therewith. The sleeves 46 and 49 are retained together in locked relation by a locking washer 53, the end of the sleeve 49 and the hub of the wheel 51 are spaced by a gasket 54, and the inner end of the threaded sleeve 50 is centered within the outer end of the sleeve 46 by a bushing 55. A nut 56 is threaded on the outer end of the sleeve 50 to lock the control wheel 52 in position. The limit bushing 30 stops the right hand travel of the shaft with the seat and valve openings 9 and 12ª in full register. The stopping function of the limit bushing 29 is not so important.

The operation of the valve control is as follows: Presuming the wedge valve 12 to be seated in line closing position, as shown in the drawings, the operator, in order to effect a movement of the valve to open or partially open the fluid line, first throws the sealing control lever 48 to the right to impart a half turn to the screw shaft 28 and cause the stop 42 to move from the inner end to the outer end of the channel 41. This movement of the shaft relative to the eccentric bushing 40 imparts an outward throw to the shaft eccentric 39 and causes the wedge valve 12 to be drawn outward from seating position between the seat members 7 and 8. At the same time the coaction of the stop 42 with the outer end wall of the channel 41 tends to turn the bushing 40 to normal position relative to the yoke arm 35ª should the bushing have previously been turned from such position by the coaction of the stop 42 with the inner end of the channel during the previous valve seating operation. The valve having thus been unseated, it may be moved lengthwise of the casing by a turning of the control wheel 52 and its threaded sleeve 50 on the threaded portion 51 of the control shaft. This stroke movement of the shaft may be sufficient to place the valve opening 12ª into full register with the fluid line openings in the casing, such movement being limited by the right hand stop 30, or the stroke may be stopped at any point short of such full movement to effect a desired partial registering of the valve opening with the fluid line. When the valve has thus been moved to the desired position with respect to the fluid line, the sealing lever 48 is moved to the left or in counterclockwise direction, thus causing the shaft eccentric 39 to turn to the left to move the valve to seating position and to throw the stop 42 from the outer to the inner end of the channel 41. If a complete seating has not been accomplished during the movement of the stop from one end to the other of the channel 41, a slight continued movement of the shaft and stop will cause the latter to act against the inner end wall of the channel 41 and turn the eccentric bushing 40 in a direction to cause a further tightening of the valve in its seat. This action is accomplished due to the offsetting of the axes of the shaft and bushing.

Another form of the invention is shown in Figs. 6 to 10. In this form, 60 designates the valve casing forming the valve chamber 61 with the axially aligned fluid line openings 62, 62, in its opposite sides, such openings being formed by nipple extensions 63 to which either a fluid line pipe or a flange for attaching such a pipe may be welded or otherwise suitably secured. These nipples are preferably reinforced by casing ribs 64. The casing 60 has a side extension 65 forming an extension 61ª of the valve chamber 61 and providing an inspection opening 66 at its outer end, which is disposed transversely of the valve movement instead of at an end thereof, as in the previous form. This opening is closed by an internally seating plug member 67 and gasket 68 similar to the manner of closing the inspection opening 17 in the previous form.

The movable wedge valve member 70 and the opposing seat members 71 and 72 therefor are the same or similar in form, mounting and operation to the corresponding members of the preceding form, except mainly that one of the seat members instead of having a rigid seat in the casing wall has a ball and socket mount therein in centered relation to the axis of the fluid line opening 62, as shown in Figs. 7 and 8. To provide such mount, a socket ring 73 is set into a marginal edge recess in said opening and the seat member 72 is provided on its outer side in marginally surrounding relation to its fluid line opening 72ª with an annular protuberant portion 74 having an outer spherical end surface complemental to and seating in said ring socket. This permits the valve member 72 to adjust itself to properly seat against the valve member, thus compensating for any error in machining of the valve and seat members and the mounting of the latter in the casing. This is quite an important feature in practice, as it not only allows for machining errors but eliminates the necessity of extremely accurate machining, and the consequent time and expense, to obtain the proper seating of the parts necessary for a tight valve joint. The seat members are held against turning around the axes of the respective openings 72 in any suitable manner, as for instance by studs inserted into the casing and interengaging with the respective member. In the present instance, the member 71 is engaged by a stud 75 mounted in a casing opening, while the member 72 is engaged by a stud 76 in an inner recess of the casing wall. The valve member 70 has an opening 70ª movable into and out of register with the seat openings 72ª so that when the valve member is in one limit of movement, the fluid line is closed, and when in its other limit of movement, such line is fully open.

While the control means for the valve member 70 is similar to that of the first-described form, it is changed in some respects to simplify its construction and operation. This control means includes a control shaft 78 extending across the chamber extension 61ª and mounted in opposite side walls thereof for rotary and axial movements, with the axial movements parallel to longitudinal movements of the valve member 70, and with one end projected through and beyond a casing boss 80 in which it has a bearing. The projecting end of the shaft is provided with a feed thread 81 and has a keyway 82 in a side thereof and extending through said threaded portion.

The shaft 75 is provided within the chamber 61ª with an eccentric portion 83 having an eccentric bushing 84 mounted thereon for rotary adjustment to vary the effective throw of the eccentric. A link 85 has a close rotary mounting on the bushing 84 so that any eccentric throw of the shaft part 83 and the bushing 84 is imparted thereto. This link is connected to the adjacent broad edge of the wedge valve 70 by a pin 86 in engagement with posts 87 anchored in and rigidly projecting from such edge of the valve whereby any longitudinal movement of the link will impart transverse seating or unseating movements to the valve. In the present instance, the posts 87 are set into recesses in the valve edge and retained therein by lock rings 88 sprung into wall grooves in the recesses and engaging over shoulders on the posts.

In order to obtain a tight sealing seat of the valve 70 between the two seat members 71, 72, the shaft is first turned to impart a limit of seating or inward throw to its eccentric 83, with the thin side of the bushing 84 substantially in line with such throw, and the bushing is then turned on the portion 83 and within the link 85 to take up any play and to cause a close seating of the valve when the eccentric 83 is in such position. The desired adjustment having thus been obtained, a lock screw 89 in the link is turned into holding engagement with the bushing 84, preferably into a registering one of a series of holes 90 in the bushing (Fig. 8). The bushing 84 may also be adjusted in the link to compensate for wear and to maintain a tight fit between the valve seating ports by an adjustment of the bushing 84 within the link.

A sleeve 91 is fixedly attached to and projects from the casing boss 80 in spaced surrounding relation to the extended end portion of the shaft 78 and has a lock collar 92 journaled in its outer end portion and internally carrying a lock key 93 engaging in the shaft keyway 82 for sliding movements therein. The key 93 is prevented from inward sliding movements relative to the collar 92 by a lock ring 94 that is sprung into a recess in the inner end portion of the collar. The collar 92 has an annular flange 95 at the outer end of the sleeve 91 in substantially abutting relation thereto and provided on its inner face, or that adjacent to the sleeve, with a depression 96 adapted to receive and be engaged by one of a series of spring pressed balls or detents 97 mounted in the facing end portion of the sleeve 91. The detents 97 are in segmental series concentric to the shaft axis. The depression 96 has an opening 98 extending outward therefrom through the flange in parallel relation to the shaft axis. Each ball or detent 97, in the present instance, is pressed outward by a respective spring 99 acting through a plunger 100. When a registering ball and flange socket 96 are interengaged, the collar 92 is locked against turnig relative to the sleeve 91 and the key 93 in turn locks the shaft 78 against turning but does not prevent longitudinal adjustment of the shaft.

The outer end of the collar 92 is cupped or recessed within the flange portion 95, and mounted in such recess for turning movements relative thereto and projecting outward therefrom is an internally threaded collar or feed nut 101 in mesh with the threads on the shaft 78. This threaded collar is retained in the recessed end of the lock collar 92 by a gasket 102 set into said recess and engaging a shoulder on the nut collar and by a spring ring 103 sprung into the wall of the recess at the outer side of the gasket.

A control wheel 105 is keyed on the outer end portion of the nut collar 101 so that a turning of the wheel will effect a turning of the nut collar on the shaft and cause longitudinal movement of the shaft in one direction or the other, depending on the direction of turning of the wheel.

The wheel 105 is provided in its hub portion with a pin 106 disposed with its axis parallel to the shaft axis and positioned the same radial distance from the shaft axis as the detent 97 in the lock collar flange 95. The pin 106 has an inward and an outward position controlled and limited by a stud 107 in the wheel hub operating in a bayonet form of slot 108 in the pin. When the pin is at its limit of outward movement, its inner end is disposed short of the stop collar flange 95, thus permitting free turning movements of the wheel relative to the lock collar, and when the pin is moved inward through a flange opening 98 in register with a detent 97 it is adapted to press such detent out of locking engagement with the flange 95 and thus permit a turning of the lock collar 92 with the wheel 105 to impart partial rotation to the shaft 78. Such turning of the shaft in one direction actuates the eccentric connection with the valve to effect an unseating thereof, and a turning in the other direction actuates the connection to effect a seating of the valve.

The pin 106 is provided, at its outer end, with a control handle 109 which facilitates both an easy turning of the pin to cause an engagement of one or the other of the laterally extending portions of its groove 108 with the stud 107, and also a movement of the pin either inward to release the locking engagement of the detent 97 with the lock collar 92 or outward to permit such locking engagement and to retract the pin sufficiently to disengage the lock collar flange 95. It will be understood that when the valve 70 is seated in any position of its lengthwise movement it is intended to be locked in such position by the engagement of the detent 97 with the lock collar flange 95, thus securing the shaft 78 against any turning movement.

It is apparent in the operation of this form of the invention that the valve member 70 may be quickly unseated from between the cooperating seating members 71 and 72, so as to permit free longitudinally shifting movements of the valve therebetween, by first throwing the pin 106 inward to release the locking engagement of the detent 97 with the lock collar flange 95. This having been done, the wheel 105 is turned to cause the collar 92, key 93, nut 101 and shaft 78 to turn together to unseat the valve 70. The valve having been unseated, the pin 106 is moved to its outer position to release the detent 97 to permit its locking with the collar flange 95 and also to cause the pin to release said flange to permit the wheel 105 and its nut 101 to turn on the shaft 78 and impart axial movement thereto to shift the valve to open or closed position, depending on the direction of turning. When the desired longitudinal adjustment of the valve 70 has been obtained, the pin 106 is turned to release the stud 107 from the inner arm of its groove and the pin is then pushed inward through a flange opening 98 in register with the detent

97 and causes a release of such detent from locking engagement with the lock collar flange. The operator then turns the control wheel 105 to impart a turning action to the lock collar 92 through the engagement of the pin 106 with its flange and to thus effect a rocking of the shaft eccentric 83 to move the valve inward to again place it in close sealing engagement with the seat members. The provision of the inspection opening 66 adjacent to a side of the eccentric connection of the shaft with the valve instead of in the casing at an end of the valve is important, as it not only facilitates easy access to the valve and seat members for inspection or replacement purposes, but also makes the eccentric connection easily accessible for adjustment purposes.

It is apparent that in each form of the invention a single pressure casing for the operating parts is provided and that this facilitates a single fixture set-up of the casing for machining purposes to insure a true relationship between the valve seats and control shafts receiving parts; also that in each form the body casing is capable of being opened for inspection as to operation of the interior parts and as to valve seat tightness in either open or closed position; also that in each form the valve control is easily and quickly operable to effect a close seating or unseating condition of the valve and a selective movement of the valve to open or closed position, or to a desired intermediate position when unseated.

The sealing means for the closure plugs 18 and 67 constitutes the subject-matter of a copending application.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a fluid pressure line valve of the class described, a valve casing having an elongated chamber therein with opposed fluid line opening in its sides intermediate its ends and with opposed relatively tapered walls, a wedge valve longitudinally movable in said chamber between said walls to open and close said openings and transversely movable to have a wedge sealing fit in the chamber at any point in its other movement, a transverse extension from said valve, a shaft mounted for rotary and axial movements in said casing, said extension being eccentrically mounted on the shaft whereby rotation of the shaft imparts sealing or unsealing movements to the valve through the extension and axial shifting movements of the shaft impart said other movements to the valve through the extension, a control for rotating said shaft, and a control having threaded connection with the shaft and operable to axially move the shaft relative to the casing.

2. In a fluid pressure line valve of the class described, a valve casing having an elongated chamber therein with opposed fluid line openings in its sides intermediate its ends, a wedge valve longitudinally movable in said chamber to open and close said openings and transversely movable therein to have a wedge sealing fit in the chamber at any point in its other movement, a transverse extension from said valve, said extension having an opening transverse to the sealing movements of the valve, an eccentric bushing in said opening, and a shaft mounted in said casing for rotary and axial movements and having an eccentric part rotatably mounted in said bushing with the axes of said part and eccentric shaft portion offset, said shaft being rotatable to impart sealing or unsealing movements to the valve and having rotary lost motion stop connection with the bushing, whereby at a predetermined point in a rotation of the shaft relative to the bushing said stop connection becomes effective to turn the bushing with the shaft to exert an added sealing pressure to the valve, the axial movements of said shaft imparting predetermined opening and closing movements to the valve.

3. In a fluid pressure line valve of the class described, a valve casing having an elongated chamber therein with opposed fluid line openings in its sides intermediate its ends and forming a wedge space between said openings, a wedge valve longitudinally movable as a unit in said space to open and close said openings and transversely movable therein to have a wedge sealing fit in the chamber at any point in its other movement, a transverse extension from said valve, a shaft mounted in the casing for rotary and axial movements, said extension having an eccentric mount on the shaft to impart transverse sealing movements to the valve by rotary movement of the shaft in any position of longitudinal movement of the valve, the axial movements of the shaft imparting longitudinal movement to the valve through said extension, and means cooperating with said shaft and extension and operable by a rotating movement of the shaft during a valve sealing operation to impart an added sealing force to the valve.

4. An arrangement as called for in claim 3, wherein said last means includes an eccentric bushing rotatable between said shaft and extension and a rotary lost motion stop connection between the shaft and bushing, which latter, when a rotation of the shaft relative to the bushing has caused a maximum valve sealing movement of the shaft eccentric, will then act on the bushing to turn it to impart an added sealing force to the valve.

5. In a fluid pressure line valve of the class described, a casing having a chamber therein with inlet and outlet fluid line openings thereto, a wedge valve adapted by one movement to seat between said openings and by another movement to open and close said openings, a shaft mounted in said casing for axial and rotary movements, a connection between said shaft and valve for imparting one of said valve movements to the valve when the shaft is rotated and the other of said movements to the valve when the shaft is axially moved, rotatable means threaded on the shaft and anchored against axial movements relative to the casing, a lock collar feathered on the shaft and free to turn relative to the casing, and means selectively operable to connect said means and collar to turn together to rotate with the shaft or to disconnect said rotatable means and collar and to anchor the collar against turning relative to the casing.

6. An arrangement as called for in claim 5, wherein the selective means includes a spring pressed detent normally operable to lock said collar against turning relative to the casing together with means manually operable to permit normal engagement of said detent and a relative turning of said rotatable means and collar or to release said detent from said collar and to cause the collar and rotatable means to turn together.

7. In a fluid pressure line valve of the class described, a casing having a chamber therein with inlet and outlet fluid line openings thereto, a wedge valve adapted by one movement to seat between said openings and by another movement to open and close said openings, a shaft mounted in said casing for axial and rotary movements, a connection between said shaft and valve for imparting one of said valve movements to the valve when the shaft is rotated and the other of said movements to the valve when the shaft is axially moved, a rotatable control member threaded on said shaft and anchored against axial movements relative to the casing, a collar rotatably mounted in the casing and feathered on said shaft, said collar being held against axial movements relative to the casing, means normally operable to lock the collar against turning relative to the casing, and means carried by said control means and movable into a position to release said locking means and to connect the collar and control for rotation, one by the other, and also operable to permit engagement of said locking means and to break the connection between the collar and control means.

8. In a fluid pressure line valve of the class described, a valve casing having an elongated chamber therein with opposed fluid line openings in its sides intermediate its ends, a wedge valve longitudinally movable in said chamber to open and close said openings and transversely movable therein to have a wedge sealing fit in the chamber at any point in its other movement, a transverse extension from said valve, said extension having an opening transverse to the sealing movements of the valve, an eccentric bushing rotatably mounted in said opening, a shaft mounted in said casing for rotary and axial movements and having an eccentric part rotatably mounted in said bushing with the axes of the extension opening and eccentric shaft part offset, said shaft being rotatable to impart sealing or unsealing movements to the valve through said extension and the axial movements of said shaft imparting predetermined opening and closing movements to the valve through said extension, and means for retaining said bushing in any position of rotary adjustment on the shaft.

9. In a fluid pressure line valve of the class described, a valve casing having a chamber therein with opposed relatively tapered faces and with opposed fluid line openings in its side faces intermediate their ends, a wedge valve movable in said chamber in a direction lengthwise to its wedge angle to open and close said openings and in a different direction therein to have a wedge sealing or unsealing movement in the chamber at any point in its other movement, means operable to selectively impart said movements to the valve, said means including a shaft, an eccentric part on the shaft and a valve extension mounted on said part, said shaft being axially shiftable to impart one of said movements to the valve through said extension and eccentric part and being rotatable to actuate the eccentric part of said connection to impart the other of said movements to the valve through the extension.

10. In a fluid pressure line valve of the class described, a valve casing having an elongated chamber therein with opposed fluid line openings in its sides intermediate its ends, a wedge valve longitudinally movable in said chamber to open and close said openings and transversely movable therein to have a wedge sealing fit in the chamber at any point in its other movement, a transverse extension from said valve, said extension having an opening transverse to the sealing movements of the valve, an eccentric bushing rotatably mounted in said opening, and a shaft mounted in said casing for rotary and axial movements and having an eccentric part rotatably mounted in said bushing with the axes of the extension opening and the eccentric shaft part offset, said shaft being rotatable to impart sealing or unsealing movements to the valve and being axially movable to impart predetermined opening and closing movements to the valve, both said valve movements being engaged through said bushing and extension.

PAUL Y. DUFFEE.

REFERENCES CITED

The following references are of record in the file of this patent:

UNITED STATES PATENTS

| Number | Name | Date |
| --- | --- | --- |
| 621,566 | Hendy | Mar. 21, 1899 |
| 673,925 | Powell | May 14, 1901 |
| 1,134,811 | Berger | Apr. 6, 1915 |
| 1,250,041 | Snyder | Dec. 11, 1917 |
| 1,722,752 | Karnath | July 30, 1929 |
| 1,933,182 | Pagon | Oct. 31, 1933 |
| 2,344,747 | Sperry | Mar. 21, 1944 |

FOREIGN PATENTS

| Number | Country | Date |
| --- | --- | --- |
| 346,826 | Italy | of 1937 |